United States Patent
Ketteler et al.

(10) Patent No.: US 7,983,814 B2
(45) Date of Patent: Jul. 19, 2011

(54) METHOD FOR OPERATING AN ACTUATOR, ESPECIALLY AN ELECTRIC ACTUATOR IN A STABILIZER ARRANGEMENT

(75) Inventors: Karl-Hermann Ketteler, Markdorf (DE); Andreas Fuessl, Kressbronn (DE); Johannes Schmid, Walding (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 831 days.

(21) Appl. No.: 12/012,882

(22) Filed: Feb. 6, 2008

(65) Prior Publication Data
US 2008/0221757 A1   Sep. 11, 2008

(30) Foreign Application Priority Data
Feb. 7, 2007  (DE) .................. 10 2007 005 983

(51) Int. Cl.
*B60G 17/018* (2006.01)
(52) U.S. Cl. ............. 701/37; 280/5.502; 280/5.511
(58) Field of Classification Search ............ 701/37, 701/38; 280/5.502, 5.507, 5.508, 5.511, 280/5.519
See application file for complete search history.

(56) References Cited

U.S. PATENT DOCUMENTS

| | | | | |
|---|---|---|---|---|
| 4,728,120 A | * | 3/1988 | Buma et al. | 280/5.519 |
| 5,217,245 A | * | 6/1993 | Guy | 280/124.152 |
| 5,765,115 A | * | 6/1998 | Ivan | 701/38 |
| 7,311,316 B2 | * | 12/2007 | Yasui et al. | 280/5.511 |
| 7,501,786 B2 | * | 3/2009 | Yasui et al. | 318/799 |
| 7,543,823 B2 | * | 6/2009 | Buma et al. | 280/5.502 |
| 2006/0138732 A1 | * | 6/2006 | Buma et al. | 280/5.5 |
| 2007/0114733 A1 | | 5/2007 | Yasui | |
| 2007/0182110 A1 | * | 8/2007 | Urababa | 280/5.508 |
| 2009/0091094 A1 | * | 4/2009 | Sano | 280/5.511 |
| 2009/0224493 A1 | * | 9/2009 | Buma et al. | 280/5.511 |

FOREIGN PATENT DOCUMENTS

| | | |
|---|---|---|
| DE | 103 16 114 | 11/2004 |
| EP | 1 705 038 | 9/2006 |
| EP | 1 714 808 | 10/2006 |
| WO | WO 2004/089663 | 10/2004 |
| WO | WO 2006/134954 | 12/2006 |
| WO | WO 2006/135072 | 12/2006 |

* cited by examiner

*Primary Examiner* — Paul N Dickson
*Assistant Examiner* — Drew Brown
(74) *Attorney, Agent, or Firm* — Cohen Pontani Lieberman & Pavane LLP

(57) ABSTRACT

Method for operating an adjustable stabilizer arrangement including an actuator, which applies actuator torque to stabilizer sections as a function of a command variable to influence the rolling movement of a motor vehicle body, where sensors are used to detect the movement of the motor vehicle body and the movements of the wheels. An operating condition of the actuator supplies a variable which can be used to determine the actuator torque, upon which is superimposed an adjustment signal for the actuator, and where the variable is modified by a weighting factor.

8 Claims, 4 Drawing Sheets

US 7,983,814 B2

METHOD FOR OPERATING AN ACTUATOR, ESPECIALLY AN ELECTRIC ACTUATOR IN A STABILIZER ARRANGEMENT

BACKGROUND OF THE INVENTION

1. Field of the Invention

The invention pertains to a method for operating an adjustable stabilizer arrangement in a motor vehicle having a body and wheels, wherein the arrangement includes a pair of stabilizer sections connected to respective wheels on an axle of a vehicle, and an actuator having an electric motor for applying torque to the stabilizer sections.

2. Description of the Related Art

A stabilizer arrangement with an electric actuator is known from US 2007/0114733, where a rolling motion of the motor vehicle body is to be counteracted by means of automatic control of the actuator. A motor vehicle body, however, rolls not only when traveling around a curve but also while traveling straight ahead, i.e., when a wheel on one side is elastically deflected. It must be kept in mind here that the motor vehicle body moves at a frequency on the order of up to 1 Hz, whereas the frequency of the elastic deflection of a wheel can be as high as approximately 10 Hz.

According to the mathematical rules of oscillation theory, a stabilizer arrangement with an actuator represents a single-mass oscillation system with a pronounced resonance frequency in cases where the torque-transmission chain between the actuator and the stabilizer is highly efficient. The stabilizer forms the spring, and a rotor of the actuator is to be considered the mass, which has a certain mass inertia. The influence of the rotor mass becomes even greater when high-efficiency gearing is used between the actuator and the stabilizer. It is the square of the speed-reduction ratio of the gearing which enters into the calculation of the mass moment of inertia of the rotor. The resonance frequency in known systems is in the approximate range of 5-7 Hz, which is thus in the range of the oscillation frequency of the wheels. When the actuator is under open-loop or closed-loop control without consideration of these facts, the actuator executes very large control movements or exerts very large control forces, which are transmitted to the motor vehicle body and are perceived as uncomfortable by the passengers.

One solution to this problem could be to use low-efficiency gearing. By the use of low-efficiency gearing, there will be no resonance frequency as long as there is sufficient power loss (i.e., enough damping) in the gearing. One disadvantage of this solution is that, in an active sense, a large amount of engine power, corresponding to the power loss due to the gearing, is required to move the actuator. A second disadvantage is that the active stabilizer acts for the most part as a passive stabilizer when excited by the road. It can therefore be expected that much of the wheel excitation occurring on one side will be transmitted to the other side.

Another solution to the problem could be to increase the spring rate of the stabilizer. Because the modulus of elasticity of steel cannot be increased significantly, the spring rate must be increased by changing the cross section of the stabilizer. Increasing the cross section, however, is frequently associated with a disadvantageous increase in weight or in the amount of space occupied.

Another possibility would be to omit the actuator gearing and to use a very high-powered actuator instead. A high-powered actuator is either very expensive or very bulky.

It is proposed in DE 103 16 114 A1 that the signal components generated by the road simply be removed by sending them through a high-pass filter. This, however, leads to a loss of important data describing the rolling behavior of the motor vehicle body, and these data are therefore unavailable to the stabilizer control system.

SUMMARY OF THE INVENTION

The task of the present invention is to change the resonance behavior of the stabilizer arrangement in such a way that the motor vehicle body movements are comfortable during operation of the motor vehicle.

According to the invention, an operating movement of the actuator furnishes a variable which can be used to determine actuator torque, in that an actual signal of the actuator is detected and then modified by at least one weighting factor.

In a conventional actuator control system, the required torque is determined on the basis of several components, namely, the mass moment of inertia of the actuator, frictional torques within the stabilizer arrangement, and a motor vehicle level component, that is, the instantaneous roll position. It is possible in this way to achieve satisfactory suppression of a rolling movement of the motor vehicle body as it travels around a curve.

Whenever there is an elastic deflection of a wheel on one side, the stabilizer sections execute torsional movement with respect to each other, which is transmitted to the actuator. This torsional movement of the stabilizer section leads to an opposite operating movement of the actuator. The weighting factor has the effect of damping the influence of the elastic deflection on the grand total of the actuator torque. For a passenger in the motor vehicle, this method means that, when there is an inward elastic deflection of a wheel on one side of the motor vehicle, the supporting torque acting in the direction opposite the rolling movement will still increase, but it will not increase abruptly, which means that more comfortable driving behavior is achieved.

In another advantageous embodiment, the operating movement is detected as a change in the actuator angle per unit time.

Another approach to a solution consists in that a signal representing the difference angle between the movements of the wheels on one motor vehicle axle supplies a variable which can be used to determine the actuator torque.

By providing this variable, the spring rate of the stabilizer sections can be modified on the basis of calculations performed in the electronic control system without the need to make any physical changes to the components.

In another advantageous embodiment, the wheel-based difference angle, the engine angle, and the change in the actuator angle per unit time supply additive variables which can be used to determine the nominal actuator torque by the use of at least one weighting factor.

By detecting the angular motion of the actuator and the difference angle between the two wheels, signals can be made available which represent "spring torque" and "damping torque" in the equation of motion of a torsional oscillator. By means of evaluation on the basis of application-specific, selectable factors, it is possible to determine a nominal damping torque value and a nominal spring torque value, which can then be added to the nominal value of the drive control system.

It is therefore possible to adapt the system behavior of the torsional oscillator as desired by means of active intervention in the engine torque with the goal of achieving optimal, application-specific adaptation of the measures described above.

Because the necessary sensor system is already present, it is especially advantageous here for the actuator movement to be detected as the rotational angle of the electric motor. In theory, a servo cylinder could also be used to generate a torsional movement in a stabilizer arrangement. In that case, however, the axial movement of the servo cylinder would have to be converted to a rotational angle. According to an advantageous embodiment, the difference angle is detected by a sensor installed functionally between the stabilizer sections which rotate relative to each other. The sensor can be installed inside the actuator and thus be well protected. Another advantageous measure consists in using the sensor system required for the desired command action to optimize the action of the disturbance variable as well.

The weighting components for the operating movements and the spring rate are fixed values and can be determined on the basis of simulations, for example, or on the basis of driving tests. The desired driving behavior plays the key role here—whether the motor vehicle should have a sporty feel or be more comfortable. This leads to the possibility of establishing the weighting factor independently of each other by means of, for example, a selector switch.

It is also provided that a processor unit for the actuator be operated at a clock frequency which is greater by a factor of at least 5 than the maximum anticipated working frequency of the stabilizer arrangement. Tests have shown that the stabilizer arrangement obeys the adjustment signals of the actuator with practically no deviation—that is, the adjustment signal corresponds to the actual signal—at working frequencies of up to 40 Hz. For the present method, the possibility is thus obtained of providing an open-loop control section instead of a closed-loop control section and thus of being able to omit additional signal comparisons.

DETAILED DESCRIPTION OF THE PREFERRED EMBODIMENTS

Figure 1:
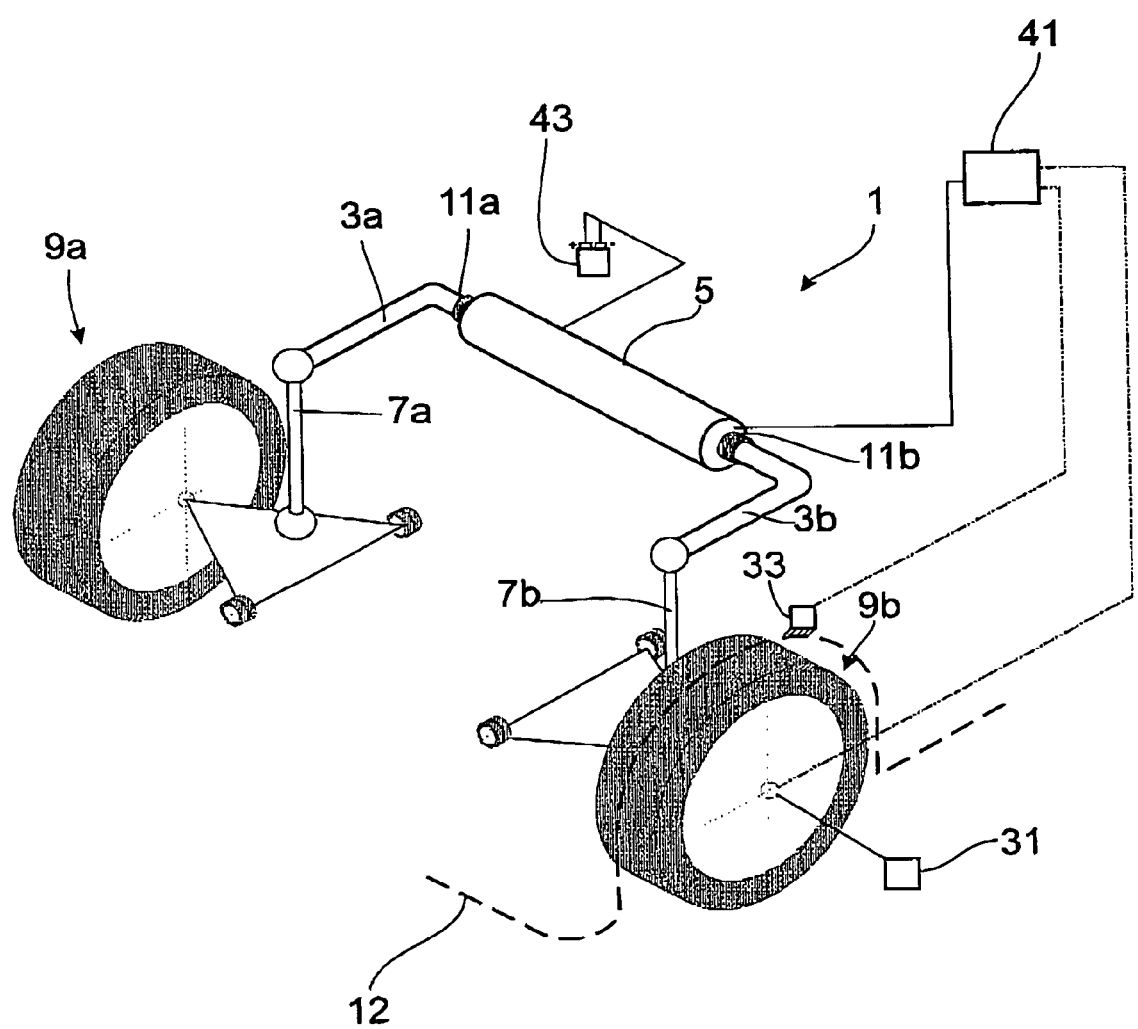
FIG. 1 shows a schematic diagram of a motor vehicle axle with an inventive stabilizer arrangement.

FIG. 1 shows a schematic diagram of a stabilizer arrangement 1, which comprises a two-part stabilizer with stabilizer sections 3a; 3b and an actuator 5, installed between the two stabilizer sections. Each stabilizer section 3a; 3b is connected to a motor vehicle wheel 9a; 9b by a rocker post 7a; 7b. Two stabilizer bearings 11a; 11b connect the stabilizer arrangement to a motor vehicle body 12. When one of the motor vehicle wheels 9a; 9b is deflected elastically inward or outward or when the motor vehicle body executes a rolling movement around the longitudinal axis, the corresponding stabilizer section 3a; 3b is subjected to torsion as a function of the length ratios.

Figure 2:
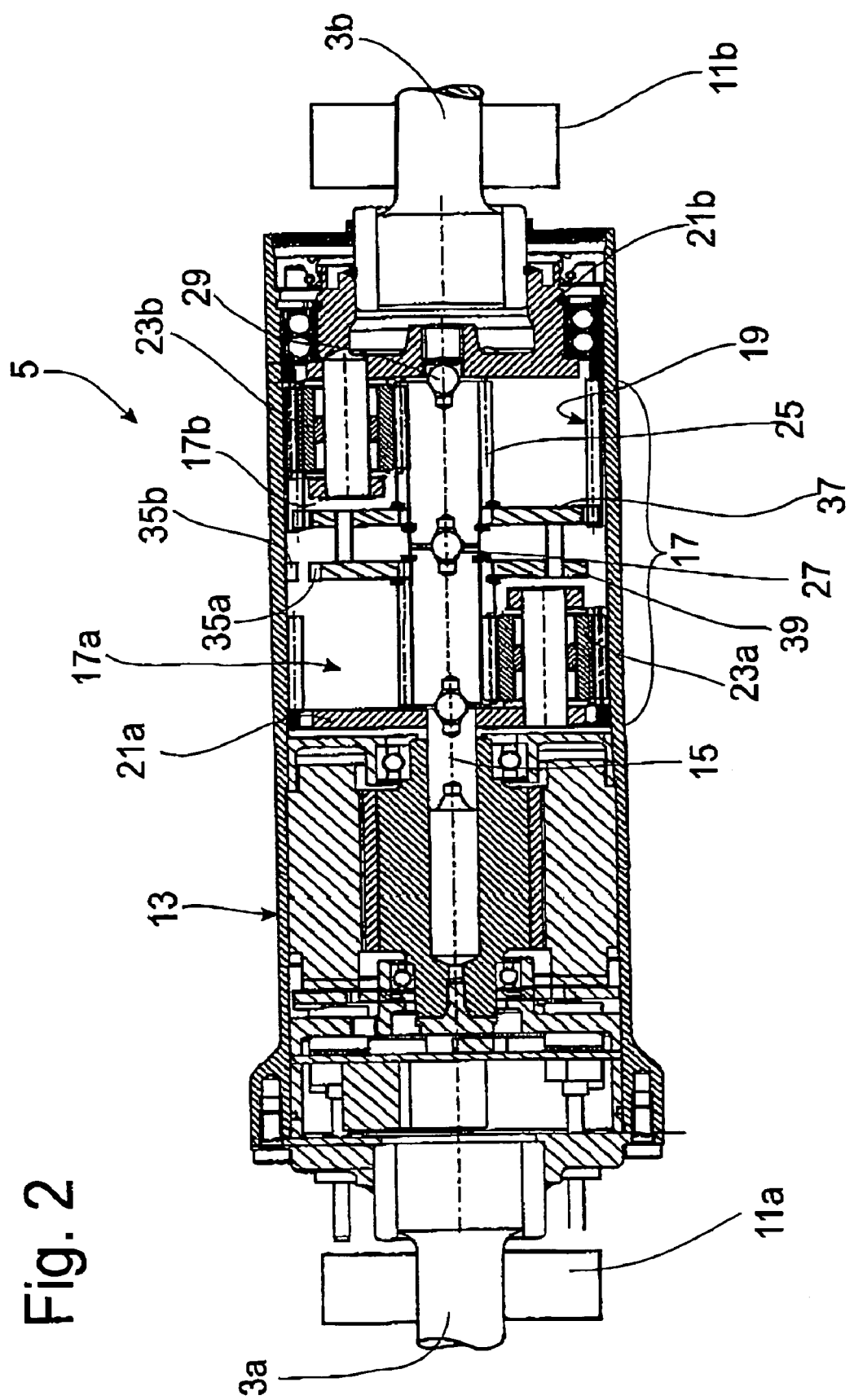
FIG. 2 shows a cross section through the actuator of FIG. 1.

FIG. 2 is limited to a longitudinal cross section through the actuator 5. In a housing 13, an electric oscillating motor with a rotor shaft 15 is provided to adjust the stabilizer arrangement. The stabilizer section 3a is permanently connected to the housing 13 of the oscillating motor. Between the rotor shaft 15 and the stabilizer section 3b, a two-stage gear mechanism is provided, in this case planetary gearing 17. The inside wall of the housing forms a ring gear 19. On the input side of the gearing, the stabilizer section 3b acts on a planet wheel carrier 21b, the planet wheels 23b of which engage in turn with a sun wheel 25 as the output of the gear mechanism. The sun wheel 25 is formed by an intermediate shaft between the rotor shaft 15 and the planet wheel carrier 21, all three of these previously mentioned components being able to move relative to each other in the circumferential direction on bearings 27; 29. Another gear stage 17a with a planet wheel carrier 21a and planet wheels 23a engages with the rotor shaft 15.

If the oscillating motor is disconnected from the power supply, the stabilizer ends can move independently of each other, aside from frictional forces, e.g., in the bearings and in the gearing 17. When the current is turned on again, the electric motor generates an adapted countertorque acting against the torque in question resulting from excitation by the road surface or a rolling movement of the motor vehicle body. The magnitude of the countertorque and the allowable rotational angle of the stabilizer sections are calculated on the basis of signals, which are made available by a sensor system, which detects the movement of the motor vehicle body and a wheel movement. The sensor system can comprise, for example, wheel sensors 31, a motor vehicle body sensor 33, but also a sensor 35a; 35b inside the oscillating motor, which detects the rotational speed and the rotational angle, as a function of direction, between the stabilizer sections 3a; 3b. A sensor 35a; 35b can be located, for example, between the inside wall of the housing and each of the two transfer gear wheels 37; 39 between the two gear stages. The signals from the sensors 31 and 33 are sent to a processor unit 41, which uses these signals to determine the adjusting torque to be produced by the oscillating motor.

Figure 3:
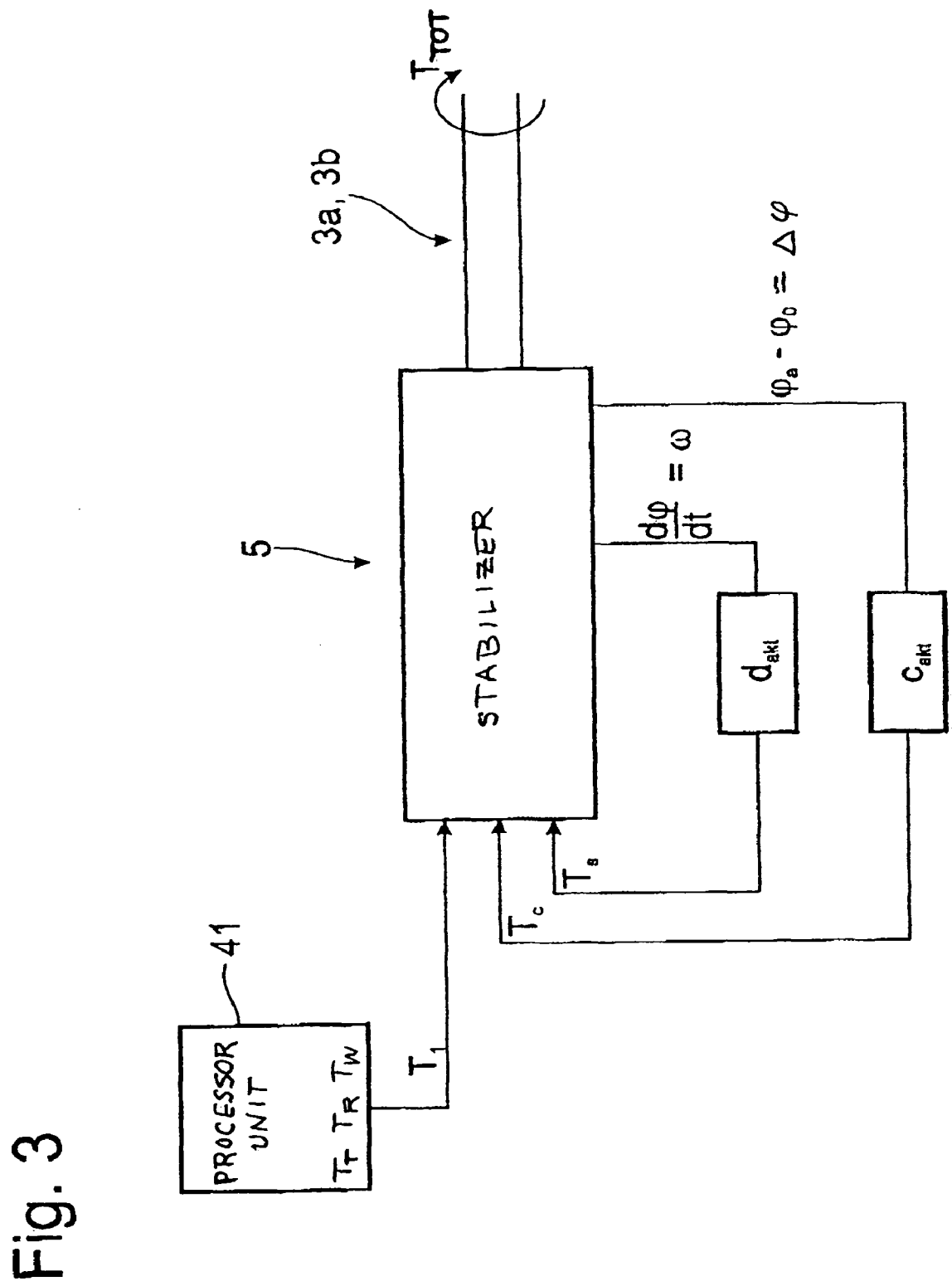
FIG. 3 shows an equivalent diagram of the method.

FIG. 3 shows an equivalent diagram of the inventive method. The processor unit determines the adjustment variables for the motor torque $T_1$, where the adjustment variable takes into account a component $T_T$ for the mass inertia of the electric motor, e.g., of the rotor and the planetary gearing 17. In addition, the adjustment variable contains an actuator torque component $T_R$ to take into account the internal friction of the actuator and of the stabilizer sections 3a; 3b. Another component $T_W$ of the countertorque to be applied by the actuator is determined by the rolling movement of the motor vehicle body.

Through evaluation of the sensor 35a; 35b, a rotational velocity signal $\omega = d\phi/dt$ is obtained, which, with the use of a weighting factor $d_{akt}$, determines another actuator torque component $T_S$. When a wheel 9a; 9b deflects elastically inward on one side, the actuator executes an operating movement by way of the stabilizer sections 3a; 3b and the gearing 17, this movement corresponding in practice to road surface detection. The actuator torque component $T_S$ acts in opposition to the rolling movement of the motor vehicle body associated with the inward elastic deflection, where the weighting factor $d_{akt}$ functions as damping for the overall system. The weighting factor $d_{akt}$ is motor vehicle-dependent and represents a fixed value, but it can be set by the use of a selector switch, for example, to make the driving behavior of the motor vehicle more sporty or more comfortable.

In addition, the difference angle $\Delta\phi$ between the deflections of the stabilizer sections of the two wheels of one axle can be detected and also modified by a weighting factor $c_{akt}$. From the product of the rotational angle multiplied by the spring rate c, it is thus possible to obtain an actuator torque component $T_C$, which represents in practice a correction of the spring rate of the stabilizer sections for the overall system without the need to make any structural changes to the stabilizer sections. The components $T_c$ and $T_w$ are superimposed on the command variable $T_1$ so that the stabilizer outputs a total torque $T_{TOT}$.

The difference angle $\Delta\phi$ can be found by means of the sensors 35a; 35b, for example, so that, with respect to the method for operating the stabilizer arrangement, the same sensors 35a; 35b can be used both to determine the command variable $T_1$ and also to optimize the way in which the wheel movement is taken into account as a disturbance variable by the actuator torques $T_S$ and $T_C$.

The weighting factor $c_{akt}$ can also be adjustable, or a selection mode can be used in conjunction with the weighting factor $d_{akt}$ to tune the chassis in the desired way. The one-sided inward elastic deflection of a wheel is to be considered a disturbance variable with a much higher frequency than the disturbance variable represented by the rolling movement. Through consideration of the actuator torque components $T_1$ separately from the actuator torque components $T_S$ and $T_C$, a comparatively simple algorithm can be used in the processor unit 41.

The processor unit 41 for the actuator 5 is operated at a clock frequency which is greater by a factor of at least 5 than the maximum given working frequency of the stabilizer arrangement. Using a powerful processor unit, it is possible to do without signal feedback and thus without an open-loop control system, because the actuator 5 will obey the operating instructions of the processor unit 41 without error over a wide range.

As an option, the electric oscillating motor can also be used as a generator by utilizing the excitations produced by the road surface and by the rolling movements of the motor vehicle body, in which case a battery 43 can serve as an accumulator (FIG. 1).

Figure 4:
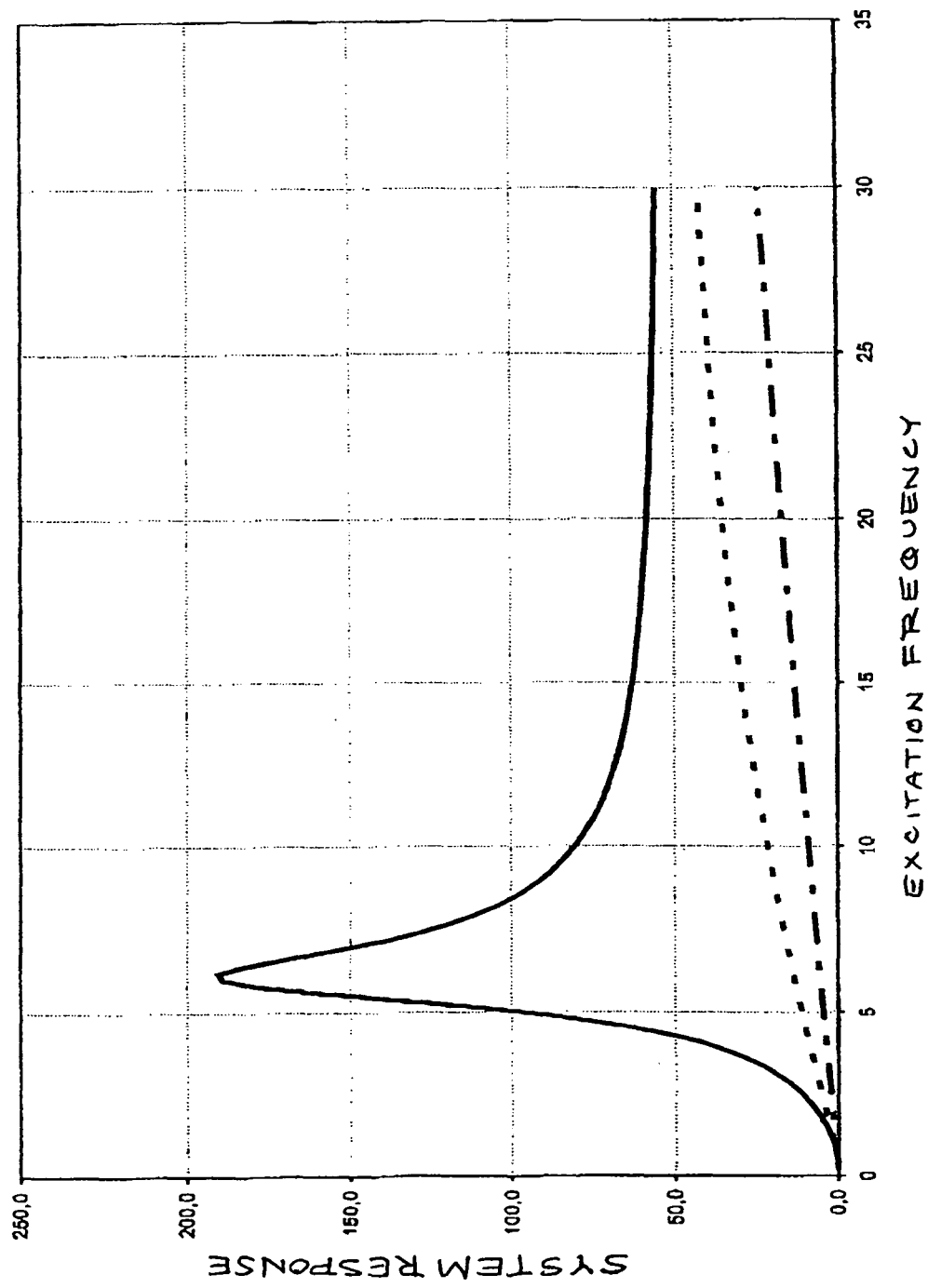
FIG. 4 shows a resonance curve of the stabilizer arrangement.

FIG. 4 shows the effect of the method in a real system. The excitation frequency is plotted on the abscissa, and the system response can be read on the ordinate. In the case of a stabilizer arrangement of conventional design and conventional operating behavior, pronounced resonance behavior occurs in the range between 5 and 10 Hz, which is disadvantageous especially because the wheels of the motor vehicle are subject precisely to this excitation frequency.

The broken and dash-dot curves show the effect of the inventive method. The curves are degressive.

What is claimed is:

1. A method of operating an adjustable stabilizer arrangement in a motor vehicle having a body and wheels, the arrangement comprising a pair of stabilizer sections connected to respective wheels on an axle of a vehicle, and an actuator having an electric motor for applying torque to the stabilizer sections, the method comprising:
   detecting movements of the motor vehicle body and the wheels;
   generating a command variable to influence roll of the motor vehicle body based on the movements of the motor vehicle body and the wheels;
   detecting an operating condition of the actuator;
   modifying the operating condition of the actuator by at least one weighting factor to produce at least one adjustment variable; and
   applying an actuator torque to the stabilizer sections as a function of the command variable and the at least one adjustment variable.

2. The method of claim 1 wherein the operating condition comprises a rotational velocity based on a change in the rotational angles of the stabilizer sections per unit time.

3. The method of claim 1 wherein the operating condition comprises a difference angle between the rotational angles of the stabilizer sections.

4. The method of claim 3 wherein the operating condition further comprises a rotational velocity based on a change in the rotational angles of the stabilizer sections per unit time, wherein the rotational velocity and the difference angle are modified by respective weighting factors to produce respective adjustment variables which are added to the command variable to determine the actuator torque applied to the stabilizer sections.

5. The method of claim 4 wherein the weighting factors are determined independently of each other.

6. The method of claim 3 wherein the difference angle is detected by a sensor installed between the stabilizer sections, which are able to turn relative to each other.

7. The method of 3 wherein the rotational angles of the stabilizer sections are also used to generate the command variable.

8. The method of claim 1 wherein a processor unit for the actuator is operated at a clock frequency which is at least five times greater than a maximum anticipated working frequency of the stabilizer arrangement.

* * * * *